Patented Aug. 23, 1938

2,127,702

UNITED STATES PATENT OFFICE 2,127,702

DECOLORIZING AND FILTERING AGENT

Richard W. Schmidt, Redondo Beach, Calif., assignor, by mesne assignments, to The Evanston Company, Los Angeles, Calif., a corporation of Nevada No Drawing. Application February 19, 1935, Serial No. 7,261

9 Claims. (Cl. 252—2)

An object of my invention is to provide a new and valuable filtering agent or filter-aid having powerful decolorizing properties.

An object of my invention is to provide a composite substance consisting of diatomaceous earth impregnated and coated with active carbon, in which the decolorizing power of the carbon is highly developed while the filtering power of the earth is materially enhanced as compared with that of the raw earth.

An object of my invention is to provide a method by which an agent having, in combination, high decolorizing power, a high flow rate, and excellent clarifying power may be produced in large quantities at a low cost.

The manufacture of decolorizing carbons is a well developed art. The carbonaceous residues from various animal and vegetable products such as wood, bones, blood, and leather have long been used for purifying and decolorizing all manner of liquids. It is also old art, to activate and increase the decolorizing power of residual carbons by oxidizing them with steam at high temperatures. It is also old art to carbonize a mixture of diatomaceous earth and organic matter to produce a decolorizing agent.

So far as I am aware, however, no substance having at once the decolorizing power of a good grade of carbon and the filtering and clarifying power of a good grade of filter-aid has ever been prepared heretofore, nor can such a substance be compounded by physical admixture of any materials known to me. Further, so far as I am aware, no one has ever proposed to activate the product resulting from the carbonization of organic matter in contact with diatomaceous earth, and it is my discovery that, weight for weight, the activated product so obtained may have the clarifying and filtering value of a first quality diatomaceous earth filter-aid together with the decolorizing value of a good grade of commercial carbon.

Before describing the peculiar properties of my composite agent I will briefly describe the materials suitable for its preparation and the manner in which it may be manufactured. In this description, as in the preceding matter, I have used the term "earth" as an abbreviation of "diatomaceous earth" and as synonymous, from a commercial standpoint, with infusorial earth and kieselguhr.

Selection of materials

The materials entering into the manufacture of my new product are diatomaceous earth and a suitable organic substance, the nature of which will be described. In the finished product the earth functions, first, as a skeleton or framework on which decolorizing carbon is formed and supported, second, as a clarifying agent and filter-aid.

In preparing diatomaceous earth filter-aids to be used as such, the raw earth is frequently calcined to remove volatile impurities and to improve the flow rate. For my present purpose it is not necessary to calcine the earth, as in the step of carbonization the earth is heated to a temperature of calcination. The earth selected, therefore, need not necessarily be an effective filtering agent in the raw state, as the treatment hereinafter described greatly improves its filtering value.

Almost all of the materials classed as organic yield a residue of carbon on destructive distillation. Of these, however, only a few classes have so far proven to be of value for my purpose.

All bodies which fuse during or prior to the completion of the carbonization step yield coarsely porous cokes having smooth pore walls. These cokes offer too small an amount of adsorptive surface to have in themselves any material decolorizing value. In the preparation of a decolorizing agent consisting solely or substantially of carbon they may sometimes be utilized to provide the support on which an active carbon may be deposited, but in my product this support is much more effectively provided by the microscopically porous earth, and the only result from forming a coarsely porous carbon in diatomaceous earth is to fill up and choke a large proportion of the pores and interstices already existing and thereby to impair the valuable properties of the earth in a greater or lesser degree.

A carbonizable material suitable for use in my process must have the property of providing a uniform thin carbon coating for the individuar diatoms during the step of carbonization. Thr the constituent particles of earth must retain their separate identity and be only lightly cemented together in the process.

So far as I am now aware, the organic material which best meets these requirements is wood, and with this material I have obtained the results later described. Other materials belonging to the general class which includes plant stalks, piths, husks, and woody seeds such as fruit pits, yield useful products which, however, are usually less valuable than those produced from wood proper. Materials consisting almost entirely of cellulose, such as cotton and some of the thin, hard seed hulls, give a product of low decolorizing value, apparently because of their inability to produce sufficient heavy vapor to coat the diatoms.

As between the various woods, the soft coniferous varieties appear to give as good a result as the hard woods which are usually chosen for the manufacture of decolorizing carbons, and so far as I am aware the decolorizing value of the residual carbon particles in the final product have much less influence on the quality of the product than the carbon which coats the diatom structures.

I therefore define the organic constituent of the mixture which I carbonize (as hereinafter described) as a "woody material", meaning to include in that definition such stalks, piths, husks, and pits as function in the described process to place a coating of carbon on the diatoms. In some of the more limited claims I also use the word "wood" in its ordinary and well-known meaning.

Preparation, intermixture and proportioning of materials

For economic reasons it is desirable to utilize wood which is otherwise waste, such as sawdust, shavings, slabs, and mill cuttings. Wood waste coarser than sawdust may be broken down in a wood hog and the product, mixed with such sawdust and shavings as may be available, is then reduced to a suitable particle size in a hammer mill or other form of disintegrator. This operation is greatly accelerated by first removing substantially all the free water. I prefer to comminute the wood to pass a 70 mesh screen, though satisfactory results may be had with considerably coarser grinding.

The earth is preferably milled to a fineness suited for use as a filter-aid. The two powders are then intermixed as completely and thoroughly as possible, preferably in the manner described in the patents issued to McKinley Stockton on January 1, 1935, Numbers 1,986,300 and 1,986,301. If desired, intermixture may be produced by milling the materials together.

The proportions in which the above materials are mixed varies with the nature of the organic material and with the character of the liquid to be decolorized and filtered. Using comminuted wood in the preparation of an agent for decolorizing and filtering sugar solutions, good results were obtained with from six to sixteen parts of wood to one part of earth, such mixtures yielding a final product, after activation, containing more or less 50% by weight of carbon. These figures are necessarily suggestive only and in no wise limiting, as the most favorable proportions for any given purpose can be found only by experiment with the particular materials and equipment available.

Carbonization of mixture of materials

The carbonization of the organic portion of the charge is carried to the point of substantial dryness, which may be the temperature most suitable for activation but should not be less than 600° C. or thereabouts. So far as I know at present, neither the rapidity with which the carbonization step is conducted nor the type of apparatus employed has any dominating effect on the properties of the finished material, and I may carbonize in closed, externally heated retorts, for the salvaging of the volatile products, or by direct contact with hot products of combustion, or in other ways disclosed in the prior art.

Activation of the carbonized charge

At the conclusion of the carbonization step I activate the heated charge by contact with a mild gaseous oxidant. As is well known, atmospheric air is an extremely active oxidant and, if used, must be handled with extreme care to avoid localized action which may remove the carbon coatings from portions of the earth. Combustion gases containing carbon dioxide are much milder and slower in their action, and steam occupies an intermediate position. As the reaction of oxygen with carbon is exothermic while carbon dioxide and steam react endothermically, the most desirable initial temperature will vary with the nature of the oxidant used and to some extent will depend on whether it is possible to supply heat during the activation. I prefer in practice to use steam as an oxidant and to maintain the temperature of the carbonized charge at about 900° C. until a trace of white ash appears, but these conditions are by no means limiting or critical.

Final comminution

If the specific manner of manufacture be such that the charge is maintained in constant motion during the carbonization step, the final product will be an incoherent powder somewhat coarser than is desirable in the finished product. If the manufacturing process be such that the charge is substantially at rest during the carbonization step, the product may be lightly cemented, to such extent that it may be rubbed to powder by light pressure between the fingers. The product, in either case, is brought back to a fineness suited for use as a filter-aid by milling or grinding in any preferred manner.

Differing in this respect from the carbons proper, my product does not require to be and should not be comminuted to extreme fineness. The reason for this lies in the structure of the new material. The particles of commercial carbons are too dense to permit any material penetration of liquid and are therefore effective only on their surfaces. The relation of surface to weight increases very rapidly as particle size diminishes, and with this increase of particle surface comes a corresponding increase in decolorizing efficiency. For this reason the carbons do not develop their theoretical maximum efficiency unless ground to a state of extreme fineness. Such grinding of course impairs the filtering and clarifying power so that an economic balance must be struck in the grinding operation between decolorizing power on the one hand and filtering and clarifying power on the other.

In the product of my invention, on the contrary, the highly porous and permeable nature of the diatomaceous earth mass exposes the surfaces of all the carbon coated diatoms to liquid contact, the superficial area thus rendered available being much greater than that of the finest powder producible by comminuting a massive carbon. For this reason the final milling should be of such nature as only to separate any cemented diatoms.

Properties of the final product

The product of my invention has certain surprising and unexpected properties which may best be illustrated by comparative figures. In Table 1 below an example of the product of the invention is compared, as to its most valued properties, with its earthly and its carbonaceous constituents, both alone and in simple admixture, and with certain representative commercial sugar-decolorizing carbons. In this table:

A is an example of the product of the invention, prepared by carbonizing a mixture of 12 parts soft wood flour with one part raw diatomaceous earth previously comminuted to filter-aid fineness. The carbonized product was activated at 900° C. with steam until a trace of ash appeared and the activated product was milled to pass 82% through a 150 mesh screen.

B is a filter-aid prepared by heating the same comminuted raw earth to 900° C. without the addition of carbonaceous matter or of any chemical or fluxing agent.

C is a wood charcoal prepared by carbonizing and activating the wood flour used in making product A, in the manner above described but without addition of earth. This charcoal was reduced to the fineness necessary to properly develop its decolorizing value.

D is a mechanical mixture of products B and C in substantially equal proportions, these proportions giving substantially the same ratio of carbon to ash as is found in product A. The mixture was made after the constituents had been finished and cooled and was as intimate as possible.

G, H, and I are commercial sugar decolorizing carbons of well-known brands, used in the condition in which they were received.

J, K, and L are mixtures of G, H, and I respectively with each an equal weight of filter-aid B, these mixtures being as intimate as possible.

These various materials were separately applied to the decolorization and clarification of standard raw sugar solutions in the standard manner used in the industry. The sugar was raw Hawaiian cane sugar and the solution was brought to 60° Brix at 17½° cent. The determinations of color reduction and clarity were made on the filtrates from the flow rate tests, a single solution being used for all the tests. The results were as follows:

*Table 1*

|  | Carbon | Ash | Dose | Decol value | Flow rate | Clarity |
|---|---|---|---|---|---|---|
|  | Percent | Percent | Percent | Percent |  |  |
| B—Filter-aid | 0 | 100.0 | 2 | 0 | 1.20 | Brilliant. |
| Do | 0 | 100.0 | 1 | 0 | 1.00 | Do. |
| C—Charcoal | 96.8 | 3.2 | 2 | 70 | .14 | Poor. |
| Do | 96.8 | 3.2 | 1 | 50 | .10 | Do. |
| D—Mixture B+C | 48.0 | 52.0 | 1+1 | 45 | .42 | Brilliant. |
| A—Final product | 53.0 | 47.0 | 2 | 70 | .90 | Do. |
| G—Comml. carbon | 77.8 | 22.2 | 2 | 60 | .12 | Fair. |
| Do | 77.8 | 22.2 | 1 | 50 | .04 | Do. |
| J—Mixture B+G | 38.9 | 61.1 | 1+1 | 45 | .42 | Do. |
| H—Comml. carbon | 96.5 | 3.5 | 2 | 70 | .14 | Fair. |
| Do | 96.5 | 3.5 | 1 | 55 | .10 | Poor. |
| K—Mixture B+H | 48.1 | 51.9 | 1+1 | 50 | .28 | Brilliant. |
| I—Comml. carbon | 96.9 | 4.1 | 2 | 60 | .16 | Fair. |
| Do | 96.9 | 4.1 | 1 | 40 | .08 | Poor. |
| L—Mixture B+I | 47.9 | 52.1 | 1+1 | 40 | .32 | Brilliant. |

*Decolorizing value relations*

The standard used for measuring reduction in color being one which reads in percentages of the total original color, it would be expected that the decolorization produced by a mixture of equal parts of a decolorizing carbon and a filter-aid having no decolorizing value would be more than half that produced by a dose of carbon equal to the combined weights, it being well known that the removal of unit color from solutions containing color bodies becomes increasingly difficult as the concentration of these bodies decreases. It seems reasonable to anticipate, however, that the decolorizing effect of a 2% dose of a mixture of which one-half is decolorizing and one-half nondecolorizing material would be substantially equal to that of the 1% of decolorant which it contains.

In the case of the mixtures this expectation was realized, within the limits of accuracy of the test, but the product of the invention (product A) has a decolorizing value far in excess of the equivalent of its weight content of charcoal, as will be seen from Table 2 below. In the tests on which this table is based the dosage of carbon alone is uniformly 1% of the weight of sugar in the test solution, while the dosage of the mixtures and of product A is uniformly 2%, one-half of which or 1% is carbon:

*Table 2*

Decolorizing value of 1% Carbon G___50%; of 2% Mixture J___45%
Decolorizing value of 1% Carbon H___55%; of 2% Mixture K___50%
Decolorizing value of 1% Carbon I___40%; of 2% Mixture L___40%

Decolorizing value of 1% Charc. C___50%; of 2% Mixture D___45%

Decolorizing value of 2% Final product A_____70%

It will be noted that product A has a decolorizing value over one and one-half times greater than that of an equivalent mixture of its components.

*Flow rate and clarity relations*

As explained above, the decolorizing carbons have only a slight effect in promoting filtration and, because of their extreme fineness, are difficult to retain on the filter cloth and give an improperly clarified, cloudy filtrate. For these reasons it is customary, in decolorizing sugar solutions, to use a filter-aid along with the carbon. In such mixtures the carbon is used solely for decolorization while the filter-aid is used to remove colloidal suspensoids existing in the raw sugar, or if these supensoids have been removed by a previous clarification, to assist in removing the spent carbon from the solution.

In view of these properties it seems reasonable to anticipate that a mixture of carbon with filter-aid will have a flow rate lower than that of the filter-aid alone but greater than that of the carbon alone. It is also to be foreseen that the clarity of the filtrate produced by the mixture may be lower than that of the filtrate from the filter-aid alone but will be much better than that of the filtrate from the carbon alone.

For the same reasons, if my final product were assumed to be a mere mixture of carbon and earth rather than the composite substance which I believe it to be, the flow rate and clarity produced by unit dose of the final product (product A) should be substantially identical with the flow rate and clarity produced by the same dose of an equivalent mechanical mixture (mixture D).

These anticipations were fully realized as regards the mixtures but not as regards product A, as is evidenced by the figures in Table 3 below:

Table 3

|  | 1% doses | | | 2% doses | |
| --- | --- | --- | --- | --- | --- |
|  | Flow rate | Clarity | | Flow rate | Clarity |
| Filter-aid B | 1.00 | Brilliant | | | |
| Carbon G | 0.04 | Fair | Mixture J | 0.42 | Fair |
| Carbon H | 0.10 | Poor | Mixture K | 0.28 | Brilliant |
| Carbon I | 0.08 | ...do... | Mixture L | 0.32 | Do. |
| Charcoal C | 0.10 | ...do... | Mixture D | 0.42 | Do. |
| Final product A | | | | 0.90 | Do. |

It will be noted that the flow rate of the final product is more than double that of the corresponding mixture and substantially the same as the flow rate of the filter-aid alone, while the clarity of the filtrate from the product is substantially identical with that of the filtrate from the filter-aid alone.

It is believed to be evident from the above figures that the product of my invention is in no sense a mixture of decolorizing carbon with diatomaceous earth filter-aid but is, on the contrary, a substance having properties entirely different from and much more valuable than those of the corresponding mixture. So far as I am aware, no substance having at once the decolorizing power of a good grade of carbon and the filtering and clarifying power of a good grade of filter-aid has ever been prepared heretofore, nor can such a substance be compounded by physical admixture of any materials known to me. I believe, therefore, that the product of my invention as above described is wholly new and novel.

The reasons for the surprising characteristics of this product are not known with certainty, though they may be surmised with some degree of probability.

The unactivated product of the carbonization step, as seen under a powerful microscope, consists of diatom structures interspersed with much larger black grains which appear to consist of residual carbon or charcoal. The diatoms which constitute the bulk of the material are in large part black and opaque and appear to be completely coated with carbon. At this stage, prior to activation, the decolorizing value of the product is very low, of the order of 10%.

It is my belief that the carbonization of the organic portion of the original mixture produces an evolution of high-boiling vapors which are condensed on the diatom surfaces and are thereafter decomposed, leaving a thin film of carbon of relatively great area.

After activation of the carbonization product the microscope shows that a part of the diatoms have regained their original transparency, the carbon coating having been burned off during the activation step. These diatoms may have been exposed more strongly to the action of the activating gas or they may have been less deeply coated with carbon. It is at least highly probable that the decolorizing value depends in a major degree on the extent of activated carbon-coated diatom surface and in a lesser degree on the activity of such charcoal grains as may remain. The relatively enormous surface of carbon exposed to fluid contact by being spread over the diatoms would account for a high decolorizing value even though the carbon coating were of a low order of activity per unit of area.

The final product of the invention is a powdered substance having substantially the physical structure of the particular earth used in its preparation and in which the carbon coating is firmly bound to the earth and not readily dislodged. It is entirely free from acidity and, in fact, has usually a slight alkaline reaction, which fits it for application to edible oils and other materials incompatible with acids. If desired, it may be neutralized or acid washed in the usual manner.

The product is useful for simultaneously decolorizing and clarifying liquids of many kinds, both aqueous and oleaginous, and particularly the raw sugar solutions to which vegetable carbons have heretofore been applied for decolorization. In this service its decolorizing value may readily be made to equal that of a good grade of sugar-refining carbon while at the same time it exhibits a filtering and clarifying power which the carbon does not possess.

A characteristic property of the product is a decolorizing value materially greater than that of a proportionate mixture of its constituents; i. e., of the same earth and the same organic matter separately treated in the disclosed manner and intermixed after such treatment in the proportions indicated by the carbon and ash contents of the product.

A characteristic property of the product is a flow rate materially greater than that of a proportionate mixture of its constituents, as above defined, together with a clarifying power substantially equal to that of the mixture.

A characteristic property of the product is a decolorizing value materially greater than that of the carbon content (i. e., of a quantity of carbonized and activated residue from the same organic matter equal to the quantity of carbon contained in the product) together with a flow rate and clarifying value materially greater than that of a proportionate mixture of its constituents, as above defined.

A characteristic property of the product is that it consists substantially of carbon-coated diatoms having a material decolorizing value for sugar solutions.

I claim as my invention:

1. The method of producing a filter-aid having decolorizing properties which comprises: heating an incoherent powdered mixture consisting substantially of diatomaceous earth and woody material to a temperature sufficient to carbonize said woody material; thereafter contacting the carbonized product with a mild gaseous oxidizing agent until a desired decolorizing value is imparted to said product, and maintaining said product throughout said contacting step at a temperature not below said carbonization temperature.

2. The method of producing a filter-aid having decolorizing properties which comprises: heating a powdered mixture consisting substantially of diatomaceous earth and woody material to a temperature sufficient to carbonize said woody material; thereafter contacting the carbonized product with a mild gaseous oxidizing agent until a desired decolorizing value is imparted to said product, and maintaining said product throughout said contacting step at a temperature materially higher than said carbonization temperature.

3. The method of producing a filter-aid having decolorizing properties which comprises: heating a powdered mixture consisting substantially of diatomaceous earth and woody material to a temperature sufficient to carbonize said woody material; and not substantially less than 600° centigrade; thereafter contacting the carbonized product with a mild gaseous oxidizing agent until a desired decolorizing value is imparted to said product, and maintaining said product throughout said contacting step at a temperature materially higher than 600° centigrade.

4. A filter-aid having decolorizing properties, said filter-aid consisting of diatomaceous earth having carbon deposited on substantially all of its constituent diatoms, said filter-aid having a decolorizing power for raw sugar solutions at least one-fourth greater than that exhibited by a mechanical mixture, of equal carbon content, of diatomaceous earth with a reference carbon prepared by carbonizing soft wood flour at 600° C. and activating the carbonized product to maximum activity by contact with steam at 900° C.

5. A filter-aid having decolorizing properties, said filter-aid consisting of diatomaceous earth having carbon deposited on substantially all of its constituent diatoms, said filter-aid having a decolorizing power for raw sugar solutions at least one-fourth greater than that exhibited by a mechanical mixture, of equal carbon content, of diatomaceous earth with a reference carbon prepared by carbonizing soft wood flour at 600° C. and activating the carbonized product to maximum activity by contact with steam at 900° C., said filter aid further having a clarifying power for said solutions at least equal to that of said mixture.

6. A decolorizing filter-aid consisting of substantially one part of decolorizing carbon combined with one part of a non-decolorizing diatomaceous earth filter-aid, the combined two parts having a decolorizing value for raw sugar solutions approximately one and one-half times that of the one part of the same carbon when uncombined and a filtering value for said solutions approximately equal to that of the one part of the same filter-aid when uncombined.

7. A decolorizing and filtering agent consisting of diatomaceous earth having carbon deposited as a consistent coating on at least a part of its constituent diatoms and having the power of removing from an aqueous solution of Hawaiian raw sugar at 60° Brix not less than one-half the color thereof when applied in a dose equal to two per cent of the weight of the sugar therein, having a flow rate not less than one-half that of an equal weight of said diatomaceous earth, and a clarifying value not less than that of an equal weight of said diatomaceous earth, all said tests being made on the same raw sugar solution.

8. A filter-aid having decolorizing properties, said filter-aid being diatomaceous earth having at least a part of its constituent diatoms coated with deposited and activated carbon, said filter-aid having the power of removing not less than one-half the color from an aqueous solution of raw Hawaiian cane sugar of 60° Brix when applied in quantity equal to two percent of the weight of sugar in said solution and a flow-rate not less than one-half that of said diatomaceous earth, all when applied to the same sugar solution in the same two percent quantity.

9. A filter-aid having decolorizing properties, said filter-aid being diatomaceous earth having at least a part of its constituent diatoms coated with deposited and activated carbon, said filter-aid having a decolorizing value for an aqueous solution of raw Hawaiian cane sugar at 60° Brix approximately one and one-half times that of a mechanical mixture of the same carbon with the same earth in the proportions in which said carbon and said earth exist in said filter-aid, and a filtering value at least equal to that of said mechanical mixture when applied to the same sugar solution and in the same quantity used in determining said decolorizing value.

RICHARD W. SCHMIDT.